(12) United States Patent  (10) Patent No.: US 8,416,079 B2
Roesner  (45) Date of Patent: Apr. 9, 2013

(54) SWITCHING RADIO FREQUENCY IDENTIFICATION (RFID) TAGS

(75) Inventor: Bruce B. Roesner, Durham, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 521 days.

(21) Appl. No.: 12/477,064

(22) Filed: Jun. 2, 2009

(65) Prior Publication Data

US 2010/0302012 A1  Dec. 2, 2010

(51) Int. Cl.
  *G08B 23/00*  (2006.01)
  *G06K 5/00*  (2006.01)
(52) U.S. Cl. .............................. 340/572.1; 235/382
(58) Field of Classification Search .......... 340/10.4, 340/10.5, 10.1, 5.4, 572.1, 5.41, 5.62, 572.7; 200/600; 235/382, 600, 382.5
See application file for complete search history.

(56) References Cited

U.S. PATENT DOCUMENTS

| | | |
|---|---|---|
| 3,568,197 A | 3/1971 | Cubley |
| 3,663,932 A | 5/1972 | Mount et al. |
| 3,688,250 A | 8/1972 | Howlett |
| 3,693,059 A * | 9/1972 | Harris ........................ 200/600 |
| 3,696,429 A | 10/1972 | Tressa |
| 3,876,946 A | 4/1975 | La Clair et al. |
| 3,984,835 A | 10/1976 | Kaplan et al. |
| 4,243,955 A | 1/1981 | Daniel et al. |
| 4,297,672 A | 10/1981 | Fruchey et al. |
| 4,325,057 A | 4/1982 | Bishop |
| 4,509,123 A | 4/1985 | Vereen |
| 4,595,915 A | 6/1986 | Close |
| 4,849,706 A | 7/1989 | Davis et al. |
| 4,857,925 A | 8/1989 | Brubaker |
| 4,870,391 A | 9/1989 | Cooper |
| 4,873,529 A | 10/1989 | Gibson |
| 4,903,033 A | 2/1990 | Tsao et al. |
| 4,968,967 A | 11/1990 | Stove |
| 5,012,225 A | 4/1991 | Gill |
| 5,021,780 A | 6/1991 | Fabiano et al. |
| 5,038,283 A | 8/1991 | Caveney |
| 5,095,536 A | 3/1992 | Loper |
| 5,165,109 A | 11/1992 | Han et al. |
| 5,278,563 A | 1/1994 | Spiess |
| 5,278,569 A | 1/1994 | Ohta et al. |
| 5,293,408 A | 3/1994 | Takahashi et al. |
| 5,334,822 A | 8/1994 | Sanford |
| 5,381,157 A | 1/1995 | Shiga |

(Continued)

FOREIGN PATENT DOCUMENTS

CA  2218269  4/1999
DE  102005062827  6/2007

(Continued)

OTHER PUBLICATIONS

U.S. Appl. No. 12/856,706, filed Aug. 16, 2010, Burnett.

(Continued)

*Primary Examiner* — Benjamin C Lee
*Assistant Examiner* — Sigmund Tang (57) ABSTRACT

The present disclosure is directed switching RFID tags. In some implementations, the RFID system includes an RFID tag and a panel. The panel includes one or more contacts configured to move between a first position and a second position. The second position forms an electrical connection between the RFID tag and the one or more contacts to update a state of the RFID tag.

20 Claims, 8 Drawing Sheets

U.S. PATENT DOCUMENTS

| | | | |
|---|---|---|---|
| 5,396,489 A | 3/1995 | Harrison |
| 5,430,441 A | 7/1995 | Bickley et al. |
| 5,444,864 A | 8/1995 | Smith |
| 5,461,374 A | 10/1995 | Lewiner et al. |
| 5,477,215 A | 12/1995 | Mandelbaum |
| 5,495,500 A | 2/1996 | Jovanovich et al. |
| 5,506,584 A | 4/1996 | Boles |
| 5,519,729 A | 5/1996 | Jurisch et al. |
| 5,539,394 A | 7/1996 | Cato et al. |
| 5,608,379 A | 3/1997 | Narlow et al. |
| 5,613,216 A | 3/1997 | Galler |
| 5,630,072 A | 5/1997 | Dobbins |
| 5,648,767 A | 7/1997 | O'Connor et al. |
| 5,649,295 A | 7/1997 | Shober et al. |
| 5,661,485 A | 8/1997 | Manuel |
| 5,661,494 A | 8/1997 | Bondyopadhyay |
| 5,668,558 A | 9/1997 | Hong |
| 5,708,423 A | 1/1998 | Ghaffari et al. |
| 5,729,576 A | 3/1998 | Stone et al. |
| 5,745,037 A | 4/1998 | Guthrie et al. |
| 5,777,561 A | 7/1998 | Chieu et al. |
| 5,784,414 A | 7/1998 | Bruekers et al. |
| 5,825,753 A | 10/1998 | Betts et al. |
| 5,831,578 A | 11/1998 | Lefevre |
| 5,841,814 A | 11/1998 | Cupo |
| 5,850,187 A | 12/1998 | Carrender et al. |
| 5,861,848 A | 1/1999 | Iwasaki |
| 5,892,396 A | 4/1999 | Anderson et al. |
| 5,898,405 A | 4/1999 | Iwasaki |
| 5,905,405 A | 5/1999 | Ishizawa |
| 5,940,006 A | 8/1999 | MacLellan et al. |
| 5,974,301 A | 10/1999 | Palmer et al. |
| 6,025,780 A | 2/2000 | Bowers et al. |
| 6,026,378 A | 2/2000 | Onozaki |
| 6,084,530 A | 7/2000 | Pidwerbetsky et al. |
| 6,094,149 A | 7/2000 | Wilson |
| 6,107,910 A | 8/2000 | Nysen |
| 6,121,929 A | 9/2000 | Olson et al. |
| 6,137,447 A | 10/2000 | Saitoh et al. |
| 6,177,861 B1 | 1/2001 | MacLellan et al. |
| 6,192,225 B1 | 2/2001 | Arpaia et al. |
| 6,219,534 B1 | 4/2001 | Torii |
| 6,229,817 B1 | 5/2001 | Fischer et al. |
| 6,229,987 B1 | 5/2001 | Greeff et al. |
| 6,232,837 B1 | 5/2001 | Yoo et al. |
| 6,275,192 B1 | 8/2001 | Kim |
| 6,286,762 B1 * | 9/2001 | Reynolds et al. ........ 235/472.01 |
| 6,317,027 B1 | 11/2001 | Watkins |
| 6,320,542 B1 | 11/2001 | Yamamoto et al. |
| 6,366,216 B1 | 4/2002 | Olesen |
| 6,412,086 B1 | 6/2002 | Friedman et al. |
| 6,414,626 B1 | 7/2002 | Greef et al. |
| 6,442,276 B1 | 8/2002 | Doljack |
| 6,456,668 B1 | 9/2002 | MacLellan et al. |
| 6,459,687 B1 | 10/2002 | Bourlas et al. |
| 6,466,130 B2 | 10/2002 | Van Horn et al. |
| 6,492,933 B1 | 12/2002 | McEwan |
| 6,501,807 B1 | 12/2002 | Chieu et al. |
| 6,531,957 B1 | 3/2003 | Nysen |
| 6,538,564 B1 | 3/2003 | Cole |
| 6,566,997 B1 | 5/2003 | Bradin |
| 6,567,648 B1 | 5/2003 | Ahn et al. |
| 6,603,391 B1 | 8/2003 | Greeff et al. |
| 6,639,509 B1 | 10/2003 | Martinez |
| 6,700,547 B2 | 3/2004 | Mejia et al. |
| 6,714,121 B1 | 3/2004 | Moore |
| 6,714,133 B2 | 3/2004 | Hum et al. |
| 6,768,441 B2 | 7/2004 | Singvall et al. |
| 6,774,685 B2 | 8/2004 | O'Toole et al. |
| 6,784,789 B2 | 8/2004 | Eroglu et al. |
| 6,794,000 B2 | 9/2004 | Adams et al. |
| 6,798,384 B2 | 9/2004 | Aikawa et al. |
| 6,816,125 B2 | 11/2004 | Kuhns et al. |
| 6,819,938 B2 | 11/2004 | Sahota |
| 6,831,603 B2 | 12/2004 | Menache |
| 6,838,989 B1 | 1/2005 | Mays et al. |
| 6,888,509 B2 | 5/2005 | Atherton |
| 6,974,928 B2 | 12/2005 | Bloom |
| 7,009,496 B2 | 3/2006 | Arneson et al. |
| 7,034,689 B2 | 4/2006 | Teplitxky et al. |
| 7,039,359 B2 | 5/2006 | Martinez |
| 7,043,269 B2 | 5/2006 | Ono et al. |
| 7,053,755 B2 | 5/2006 | Atkins et al. |
| 7,058,368 B2 | 6/2006 | Nicholls et al. |
| 7,083,083 B2 | 8/2006 | Droz |
| 7,084,769 B2 | 8/2006 | Bauer et al. |
| 7,088,248 B2 | 8/2006 | Forster |
| 7,091,828 B2 | 8/2006 | Greeff et al. |
| 7,095,324 B2 | 8/2006 | Conwell et al. |
| 7,095,985 B1 | 8/2006 | Hofmann |
| 7,099,406 B2 | 8/2006 | Najarian et al. |
| 7,099,671 B2 | 8/2006 | Liang |
| 7,100,835 B2 | 9/2006 | Selker |
| 7,109,867 B2 | 9/2006 | Forster |
| 7,155,172 B2 | 12/2006 | Scott |
| 7,180,402 B2 | 2/2007 | Carrender et al. |
| 7,197,279 B2 | 3/2007 | Bellantoni |
| 7,199,713 B2 | 4/2007 | Barink et al. |
| 7,213,767 B2 * | 5/2007 | Tethrake et al. ............... 235/492 |
| 7,215,976 B2 | 5/2007 | Brideglall |
| 7,221,900 B2 | 5/2007 | Reade et al. |
| 7,256,682 B2 | 8/2007 | Sweeney, II |
| 7,257,079 B1 | 8/2007 | Bachrach |
| 7,284,703 B2 | 10/2007 | Powell et al. |
| 7,357,299 B2 | 4/2008 | Frerking |
| 7,375,634 B2 | 5/2008 | Sprague |
| 7,385,511 B2 | 6/2008 | Muchkaev |
| 7,388,468 B2 | 6/2008 | Diorio et al. |
| 7,388,501 B2 | 6/2008 | Tang et al. |
| 7,409,194 B2 | 8/2008 | Shi et al. |
| 7,411,505 B2 | 8/2008 | Smith et al. |
| 7,413,124 B2 | 8/2008 | Frank et al. |
| 7,429,953 B2 | 9/2008 | Buris et al. |
| 7,432,817 B2 | 10/2008 | Phipps et al. |
| 7,432,874 B2 | 10/2008 | Meissner |
| 7,440,743 B2 | 10/2008 | Hara et al. |
| 7,450,919 B1 | 11/2008 | Chen et al. |
| 7,460,014 B2 | 12/2008 | Pettus |
| 7,477,151 B2 * | 1/2009 | Forster et al. ............... 340/572.3 |
| 7,477,887 B2 | 1/2009 | Youn |
| 7,479,874 B2 | 1/2009 | Kim et al. |
| 7,492,812 B2 | 2/2009 | Ninomiya et al. |
| 7,526,266 B2 | 4/2009 | Al-Mahdawi |
| 7,548,153 B2 | 6/2009 | Gravelle et al. |
| 7,551,085 B2 | 6/2009 | Pempsell et al. |
| 7,557,762 B2 | 7/2009 | Shimasaki et al. |
| 7,561,866 B2 | 7/2009 | Oliver et al. |
| 7,562,083 B2 | 7/2009 | Smith et al. |
| 7,570,164 B2 | 8/2009 | Chakraborty et al. |
| 7,576,657 B2 | 8/2009 | Duron et al. |
| 7,580,378 B2 | 8/2009 | Carrender et al. |
| 7,583,179 B2 | 9/2009 | Wu et al. |
| 7,586,416 B2 | 9/2009 | Ariyoshi et al. |
| 7,592,898 B1 | 9/2009 | Ovard et al. |
| 7,592,915 B2 | 9/2009 | Liu |
| 7,594,153 B2 | 9/2009 | Kim et al. |
| 7,595,729 B2 | 9/2009 | Ku et al. |
| 7,596,189 B2 | 9/2009 | Yu et al. |
| 7,606,532 B2 | 10/2009 | Wuidart |
| 7,609,163 B2 | 10/2009 | Shafer |
| 7,612,675 B2 | 11/2009 | Miller et al. |
| 7,782,206 B2 | 8/2010 | Burnett et al. |
| 7,948,381 B2 * | 5/2011 | Lindsay et al. ............ 340/572.3 |
| 8,018,344 B2 * | 9/2011 | Chang et al. ................ 340/572.1 |
| 2001/0048715 A1 | 12/2001 | Lee et al. |
| 2002/0021208 A1 | 2/2002 | Nicholson et al. |
| 2002/0067264 A1 | 6/2002 | Soehnlen |
| 2002/0072344 A1 | 6/2002 | Souissi |
| 2002/0119748 A1 | 8/2002 | Prax et al. |
| 2002/0141347 A1 | 10/2002 | Harp et al. |
| 2003/0021367 A1 | 1/2003 | Smith |
| 2003/0052161 A1 | 3/2003 | Rakers et al. |
| 2003/0107877 A1 | 6/2003 | Mennecart |
| 2003/0116634 A1 | 6/2003 | Tanaka |
| 2003/0228860 A1 | 12/2003 | Jou |
| 2005/0084003 A1 | 4/2005 | Duron et al. |
| 2005/0099270 A1 | 5/2005 | Diorio et al. |

| | | | |
|---|---|---|---|
| 2005/0099340 A1 | 5/2005 | Suzuki | |
| 2005/0107051 A1 | 5/2005 | Aparin et al. | |
| 2005/0114326 A1 | 5/2005 | Smith et al. | |
| 2005/0116867 A1 | 6/2005 | Park et al. | |
| 2005/0128085 A1* | 6/2005 | Bon | 340/572.7 |
| 2005/0134461 A1* | 6/2005 | Gelbman et al. | 340/572.8 |
| 2005/0156031 A1 | 7/2005 | Goel et al. | |
| 2005/0179520 A1 | 8/2005 | Ziebertz | |
| 2005/0237843 A1 | 10/2005 | Hyde | |
| 2005/0259768 A1 | 11/2005 | Yang et al. | |
| 2006/0017570 A1* | 1/2006 | Moskowitz et al. | 340/572.7 |
| 2006/0022800 A1 | 2/2006 | Krishna et al. | |
| 2006/0086809 A1 | 4/2006 | Shanks et al. | |
| 2006/0098765 A1 | 5/2006 | Thomas et al. | |
| 2006/0103533 A1 | 5/2006 | Pahlavan et al. | |
| 2006/0125603 A1 | 6/2006 | Nahear | |
| 2006/0132313 A1 | 6/2006 | Moskowitz | |
| 2006/0183454 A1 | 8/2006 | Al-Mahdawi | |
| 2006/0214773 A1 | 9/2006 | Wagner et al. | |
| 2006/0238302 A1 | 10/2006 | Loving et al. | |
| 2006/0252398 A1 | 11/2006 | Park et al. | |
| 2006/0267734 A1 | 11/2006 | Taki et al. | |
| 2006/0290502 A1 | 12/2006 | Rawlings | |
| 2007/0001809 A1 | 1/2007 | Kodukula et al. | |
| 2007/0001813 A1 | 1/2007 | Maguire et al. | |
| 2007/0018792 A1 | 1/2007 | Take et al. | |
| 2007/0046432 A1 | 3/2007 | Aiouaz et al. | |
| 2007/0060075 A1 | 3/2007 | Mikuteit | |
| 2007/0082617 A1 | 4/2007 | McCallister | |
| 2007/0109101 A1* | 5/2007 | Colby | 340/10.4 |
| 2007/0133392 A1 | 6/2007 | Shin et al. | |
| 2007/0139200 A1 | 6/2007 | Yushkov et al. | |
| 2007/0152829 A1* | 7/2007 | Lindsay et al. | 340/572.3 |
| 2007/0164868 A1 | 7/2007 | Deavours et al. | |
| 2007/0188305 A1 | 8/2007 | Drucker | |
| 2007/0205953 A1 | 9/2007 | Bombay et al. | |
| 2007/0206704 A1 | 9/2007 | Zhou et al. | |
| 2007/0206705 A1 | 9/2007 | Stewart | |
| 2007/0222604 A1 | 9/2007 | Phipps et al. | |
| 2007/0222606 A1 | 9/2007 | Phipps et al. | |
| 2007/0236335 A1 | 10/2007 | Aiouaz et al. | |
| 2007/0285238 A1 | 12/2007 | Batra | |
| 2007/0290846 A1 | 12/2007 | Schilling et al. | |
| 2007/0290858 A1* | 12/2007 | Janke et al. | 340/572.7 |
| 2008/0012688 A1 | 1/2008 | Ha et al. | |
| 2008/0018431 A1 | 1/2008 | Turner et al. | |
| 2008/0048867 A1 | 2/2008 | Oliver et al. | |
| 2008/0049870 A1 | 2/2008 | Shoarinejad et al. | |
| 2008/0065957 A1 | 3/2008 | Shoarinejad et al. | |
| 2008/0068173 A1 | 3/2008 | Alexis et al. | |
| 2008/0084310 A1 | 4/2008 | Nikitin et al. | |
| 2008/0136595 A1 | 6/2008 | Finkenzeller | |
| 2008/0143486 A1 | 6/2008 | Downie et al. | |
| 2008/0191961 A1 | 8/2008 | Tuttle | |
| 2008/0258916 A1 | 10/2008 | Diorio et al. | |
| 2008/0278286 A1 | 11/2008 | Takaluoma et al. | |
| 2009/0022067 A1 | 1/2009 | Gotwals | |
| 2009/0053996 A1 | 2/2009 | Enguent et al. | |
| 2009/0091454 A1 | 4/2009 | Tuttle | |
| 2009/0096612 A1 | 4/2009 | Seppa et al. | |
| 2009/0101720 A1 | 4/2009 | Dewan et al. | |
| 2010/0194542 A1 | 8/2010 | Noakes et al. | |

FOREIGN PATENT DOCUMENTS

| | | |
|---|---|---|
| EP | 0133317 | 2/1985 |
| EP | 0498369 | 8/1992 |
| EP | 0156440 | 12/1992 |
| EP | 0915573 | 5/1999 |
| EP | 0923061 | 6/1999 |
| EP | 1095427 | 5/2001 |
| EP | 1436857 | 7/2004 |
| EP | 2178023 | 4/2010 |
| EP | 2178023 A2 | 4/2010 |
| FR | 2648602 | 12/1990 |
| GB | 1270456 | 4/1972 |
| JP | 1158836 | 6/1989 |
| JP | 2002-185381 | 6/2002 |
| JP | 2005-227818 | 8/2005 |
| JP | 2005-253058 | 9/2005 |
| JP | 2006-252367 | 9/2006 |
| KR | 2002-0091572 | 12/2002 |
| WO | WO 90/16119 | 12/1990 |
| WO | WO 99/05659 | 2/1999 |
| WO | WO 01/24407 | 4/2001 |
| WO | WO 03/044892 | 5/2003 |
| WO | WO 2004/001445 | 12/2003 |
| WO | WO 2005/072137 | 8/2005 |
| WO | WO 2006/037241 | 4/2006 |
| WO | WO 2006/068635 | 6/2006 |
| WO | WO 2007/003300 | 1/2007 |
| WO | WO 2007/094787 | 8/2007 |
| WO | WO 2007/126240 | 11/2007 |
| WO | WO 2009/058809 | 5/2009 |

OTHER PUBLICATIONS

International Search Report and Written Opinion issued in international application No. PCT/US2010/036878, mailed Aug. 31, 2010, 15 pages.

Bridgelall, Raj; "Bluetooth/802.11 Protocol Adaptation for RFID Tags"; Symbol Technologies, Research & Development, One Symbol Plaza, Holtsville, New York 11742; 4 pages. Retrieved from <http://www2.ing.unipi.it/ew2002/proceedings/001.pdf>.

Burgener, E.C.; "A Personal Transit Arrival Time Receiver;" IEEE—IEE Vehicle Navigation & Information Systems Conference; Ottawa, Ontario, Canada; 1993; pp. 54-55. Retrieved from <http://ieeexplore.ieee.org/xpl/freeabs_all.jsp?arnumber=585583>.

Cavoukian, Ann; "Adding an On/Off Device to Activate the RFID in Enhanced Driver's Licenses: Pioneering a Made-in-Ontario Transformative Technology that Delivers Both Privacy and Security"; Information and Privacy Commissioner of Ontario; Ontario, Canada; Mar. 2009; 3 pages. Retrieved from <http://www.ipc.on.ca/images/Resources/edl.pdf>.

Desmons, Dimitri; "UHF Gen 2 for Item-Level Tagging"; Impinji, Inc.; 24 pages. Retrieved from <http://www.impinj.com/files/Impinj_ILT_RFID_World.pdf>, [Feb. 27, 2006].

Donovan, John; "Software-Defined Radio Tackles Wireless Compatibility Issues"; Portable Design; Apr. 2006; pp. 8-12. Retrieved from <http://www.qmags.com/download/default.aspx?pub=PD&upid=11675&fl=others/PD/PD_20060401_Apr_2006.pdf>.

Han Y. et al.; "System Modeling and Simulation of RFID"; Auto-ID Labs at Fudan University, Shanghai, P.R. China; 12 pages. Retrieved from <http://www.citeseerx.ist.psu.edu/viewdoc/download?doi=10.1.1.116.7275&rep=rep1&type=pdf>,[Mar. 29, 2006].

Hansen, T. et al.; "Method for Controlling the Angular Extent of Interrogation Zones in RFID"; Seknion, Inc., 2000 Commonwealth Avenue, Suite 1008, Boston, MA 02135; 12 pages. Retrieved from <http://seknion.com/DOWNLOADS/Seknion_Paper_RFID.pdf>, [Apr. 24, 2006].

Hiltunen, Kimmo; "Using RF Repeaters to Improve WCDMA HSDPA Coverage and Capacity inside Buildings"; The 17th Annual IEEE International Symposium on Personal, Indoor, and Mobile Radio Communications (PIMRC-06); 2006; 5 pages. Retrieved from <http://www.ericsson.com/technology/research_papers/wireless_access/doc/PIMRC06_hiltunen.pdf>.

Khandelwal, G. et al. "Intelligent MAC Design for RFID Networks"; The Pennsylvania State University; 1 page, [Oct. 5, 2005].

Khandelwal, G. et al.; "OPT: Optimal Protocol Tree for Efficient Tag Identification in Dense RFID Systems"; IEEE International Conference on Communications; Jun. 11-15, 2006; pp. 128-133.

Kusy et al.; "Tracking Mobile Nodes Using RF Doppler Shifts"; Vanderbilt University, Nashville, Tennessee; 14 pages. Retrieved from <http://www.isis.vanderbilt.edu/sites/default/files/Kusy_B_11_7_2007_Tracking_M.pdf>, [Nov. 7, 2007].

"New Alien Software Can Identify Velocity, Position of Tags"; RFID News; Apr. 14, 2008; 2 pages. Retrieved from <http://www.rfidnews.org/2008/04/14/new-alien-software-can-identify-velocity-position-of-tags>.

O'Connor, Mary Catherine; "Wal-Mart Seeks UHF for Item-Level"; RFID Journal, Inc.; 2005; 2 pages. Retrieved from <http://www.rfidjournal.com/article/articleview/2228/1/1/>.

Rohatgi, A. et al.; "Implementation of an Anti-Collision Differential-Offset Spread Spectrum FRID System"; Georgia Institute of Technology, School of Electrical and Computer Engineering; IEEE Antennas Propagation Society International Symposium 2006; 4 pages. Retrieved from <http://www.propagation.gatech.edu/Archive/PG_CP_060710_AR/PG_CP_060710_AR.PDF>.

Waldrop et al.; "Colorwave: A MAC for RFID Reader Networks"; Auto-ID Center, Massachusetts Institute of Technology, Cambridge, MA; 4 pages, [May 28, 2003].

Yu, P. et al.; "Securing RFID with Ultra-Wideband Modulation"; Virginia Tech Electrical and Computer Engineering Department; Blacksburg, VA; Workshop on RFID Security; Jul. 2006; 12 pages. Retrieved from <http://events.iaik.tugraz.at/RFIDSec06/Program/papers/004%20-%20Ultra%20Wideband%20Modulation.pdf>.

"Near Field UHF Versus HF"; IDTechEx; May 16, 2006; 1 page. Retrieved from <http://www.idtechex.com/research/articles/near_field_uhf_versus_hf_00000474.asp>.

Kiming, Q. et al.; "Development of a 3cm Band Reflected Power Canceller"; Research Institute of Navigation Technology; 2001 CIE International Conference on, Proceedings; 2001; pp. 1098-1102.

"Developments in Printed Conductors and Tags"; IDTechEx; Jun. 6, 2005; 1 page. Retrieved from <http://www.idtechex.com/research/articles/developments_in_printed_conductors_and_tags_00000188.asp>.

Ryu, H-K. et al.; "Size Reduction in UHF Band RFID Tag Antenna Based on Circular Loop Antenna"; 18th International Conference on Applied Electromagnetics and Communications, ICECom; Oct. 12-14, 2005; pp. 1-4.

Binu P, et al.; "A New Microstrip Patch Antenna for Mobile Communications and Bluetooth Applications"; Microwave and Optical Technology Letters; vol. 33, No. 4, May 20, 2002; pp. 285-286.

Garg et al.; "Microstrip Radiators"; Microstrip Antenna Design Handbook; Artech House, Inc. Norwood, MA; 2001; pp. 1-72.

"Radio Frequency Identification (RFID) Primer" 23 pages. Retrieved from <http://ocw.mit.edu/NR/rdonlyres/Sloan-School-of-Management/15-762JSpring-2005/23F46055-7F21-4046-B2C3-7E96680790DD/0/rfid_primer.pdf>, [Feb. 15, 2005].

Communication Pursuant to Article 94(3) EPC issued in European Application No. 10727239.5 on Oct. 17, 2012; 3 pages.

International Preliminary Report on Patentability issued in International Application No. PCT/US2010/036878 dated Aug. 29, 2011, 9 pages.

* cited by examiner

SWITCHING RADIO FREQUENCY IDENTIFICATION (RFID) TAGS

TECHNICAL FIELD

This application relates to switching Radio Frequency Identification (RFID) tags.

BACKGROUND

RFID tags are used in a multitude of situations and may need to operate in two or more distinct conditions or states. A basic example of when an RFID tag is configured to alternate between two different states is when an RFID tag can be activated and deactivated. RFID tags may be deactivated by disrupting the radio frequency (RF) field of the tag. The utility of RFID tags, however, depends on their size, simplicity, and efficiency, and methods for deactivating RFID tags should take into account these factors. Further, as RFID tags transition between states, the present state of the RFID tag may be difficult to ascertain. It may be especially challenging to conveniently and accurately determine the current state of RFID tags that are configured to operate in more than two different states.

SUMMARY

The present disclosure is directed switching RFID tags. In some implementations, the RFID system includes an RFID tag and a panel. The panel includes one or more contacts configured to move between a first position and a second position. The second position forms an electrical connection between the RFID tag and the one or more contacts to update a state of the RFID tag.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
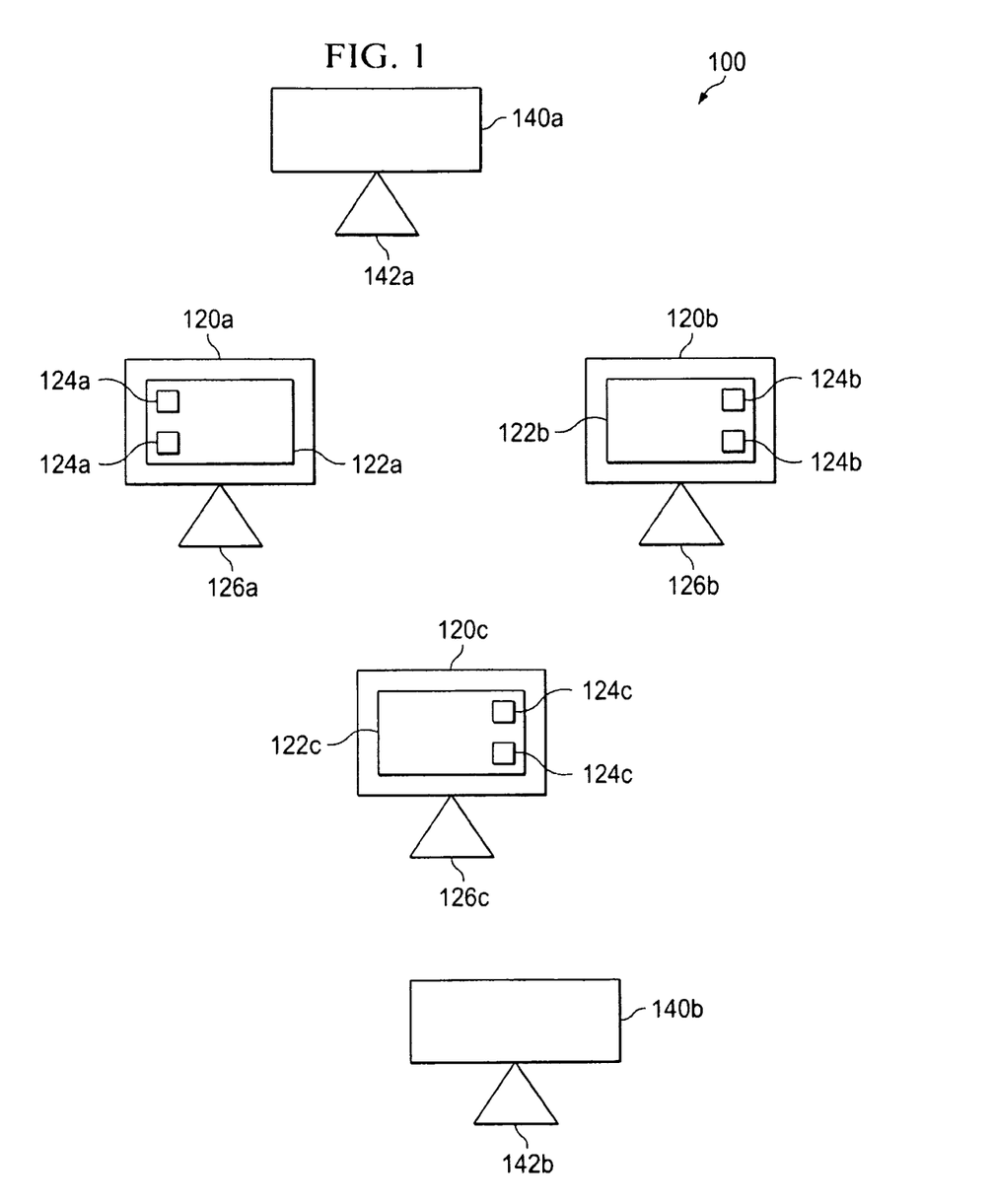
FIG. 1 illustrates an example system for identifying a state of an RFID tag.

FIG. 1 illustrates an example system 100 for updating states of Radio Frequency Identification (RFID) tags in accordance with some implementations of the present disclosure. A state may include one of a plurality of different modes of operation of an RFID tag such as active states, deactivated, an idle state, and/or any other operational state of the RFID tag. For example, an RFID tag may be configured to switch between a first state and a second state such as activated and deactivated. In some implementations, the tag state can be updated through suppression of the Radio Frequency (RF) field and/or through changing the state of the tag by redirecting a portion of the RF energy. For example, the electrical change may be accomplished by blocking the RF carrier, shorting the RF voltage on the tag, and/or rectifying the RF energy to generate a logic state. In addition, the RFID tag may include one or more visual indicators that identify a state of the RFID tag. In these instances, the RFID tag may present, in a first configuration, a first color (e.g., green) indicating an activated state and, in a second configuration, a second color (e.g., red) indicating deactivated. For example, the system 100 may include RFID tags with one or more moveable elements configured to update a tag state and visually indicate the associated tag state in response to at least the moveable elements being switched between two positions. In some implementations, the system 100 can include or execute one or more of the following: updating a tag state in response to at least one or more moveable elements switched between one or more positions; visually presenting one or more indications identifying a state of an RFID tag; deactivating an RFID tag by blocking the RF carrier; electrically shorting the RF voltage of an RFID tag; rectifying the RF energy to generate a logic state; and/or other processes. For example, the RF voltage on the tag may be shorted by placing a metal shorting bar or element across the RFID antenna using metal foil on a slide or hinged cover. Alternatively, or in combination, a moveable element may update a logic state of the tag in response to at least the tag positioned in one of a plurality of selectable position. For example, the RFID tag may be switched between three or more states in response to the moveable element being positioned between different locations with each associated with a different state. In some implementations, the system 100 may provide or otherwise include visual indications of the state of an RFID tag, the capability to deactivate an RFID tag with minimal effect on the tag's performance, state updates independent of mechanical contacts (e.g., capacitive coupling), and/or other advantages. For instance, RFID tags capable of switching between multiple, visually identifiable states may be beneficial in transportation systems. For example, the RFID tags may be used in vehicles for electronic toll collection, vehicle identification or routing, traffic monitoring, and/or other uses. The state of the RFID tag may be visually recognized by both passengers within a vehicle and onlookers outside the vehicle.

At a high level, the system 100 can, in some implementations, include one or more RFID tags 120a-c and readers 140a-b. If multiple RFID tags 120 are used, the RFID tags 120 may be used in isolation or grouped together with other RFID tags 120a-c. Each RFID tag 120 may wirelessly communicate one or more RFID readers 140 through an antenna 126. In certain implementations, each RFID tag 120 can include one or more moveable elements, such as a panel 122, that includes one or more conductive pads 124. The panel 122 may be manufactured separately from and later attached or otherwise affixed to the RFID tag 120. The conductive pads 124 may be mounted or otherwise arranged on the panel 122 to align with one or more elements of the RFID tag 120 in one of a plurality of selectable positions associated with the panel 122. In response to a selectable position of the panel 122, the conductive pads 124 for each RFID tag 120 may form a direct or indirect electrical connection to the RFID tag 120 that updates the tag state, such as deactivation or an update to the logic state. The elements of the panel 122 and/or the RFID tag 120 may visually identify a tag state based on, for example, the position of the panel and/or markings of the panel 122 and/or the RFID tag 120. In some examples, a panel 122 in a first position that does not form a connection with the conductive pad 124 with the RFID tag 120 may visually indicate an activated state, whereas a panel 122 in a second position that forms an electrical connection between the conductive pad 124 the RFID tag 120 may visually indicate a deactivated state. Panel 122 may move between the first and second position by way of a variety of methods such as, for example, rotating about a hinge, sliding between positions, folding the panel 122, and/or other methods.

The RFID tags 120 can include any software, hardware, and/or firmware configured to respond to communication from the RFID reader 140. These tags 120 may operate without the use of an internal power supply. Rather, the tags 120 may transmit a reply to a received signal using power stored from the previously received RF signals, independent of an internal power source. This mode of operation is typically referred to as backscattering. In some implementations, the tags 120 alternate between absorbing power from signals transmitted by the RFID reader 140 and transmitting responses to the signals using at least a portion of the absorbed power. In passive tag operation, the tags 120 typically have a maximum allowable time to maintain at least a minimum DC voltage level. In some implementations, this time duration is determined by the amount of power available from an antenna of a tag 120 minus the power consumed by the tag 120 and the size of the on-chip capacitance. The effective capacitance can, in some implementations, be configured to store sufficient power to support the internal DC voltage when there is no received RF power available via the antenna. The tag 120 may consume the stored power when information is either transmitted to the tag 120 or the tag 120 responds to the RFID reader 140 (e.g., modulated signal on the antenna input). In transmitting responses back to the RFID reader 140, the tags 120 may include one or more of the following: an identification string, locally stored data, tag state, internal temperature, and/or others. For example, the tag 120 may transmit information including or otherwise identifying vehicle information such as type, weight, vehicle height, tag height, account number, owner information (e.g., name, license number), and/or other information. In some implementations, the signals can be based, at least in part, on sinusoids having frequencies in the range of 902-928 MHz or 2400-2483.5 MHz. In some implementations, an RFID tag 120 in the inhibited zone may be of a type manufactured to support the ISO 18000-6C standard. An RFID tag manufactured to ISO 18000-6C standard may support dual states: an A state, in which the RFID tag is responsive to RF interrogation, and a B state, in which the RFID tag is temporarily unresponsive to RF interrogation. Under the ISO 18000-6C standard, an RFID tag may typically remain in an unresponsive B state for between 0.8 seconds and 2.0 seconds even without any further power being supplied to the RFID tag 120.

In the illustrated implementations, the RFID tag 120 includes a panel 122, electrical contacts 124, and the antenna 126. The panel 122 may include one or more moveable elements that switch between a plurality of selectable positions.

In some implementations, the panel 122 may slide between different positions associated with different tag states. In some implementations, the panel 122 may fold between two positions associated with different states. In some implementations, the panel 122 may present one or more visual indicators identifying a current state of the RFID tag. In a first configuration, the panel 122 may present a green color indicating an active state to observers, and in a second configuration, the panel 122 may present a red color indicating a deactivated state to observers. In response to switching between different configurations, the electrical contacts 124 may dynamically update a state of the RFID tag 120. The electrical contacts 124 may form a shield that substantially prevents the RFID tag 120 from receiving RF signals and/or may form direct or indirect electrical connections with the RFID tag 120 to update the state. In some implementations, the electrical contacts 124 may shield, using conductive elements, the RFID tag 120 to substantially prevent reception of RF signals. For example, the electrical contacts 124 may include a metal foil that overlays at least a portion of the RFID 120 in a first position such that the metal foil substantially shields the antenna 126. In some implementations, the electrical contacts 124 may deactivate the tag 120 by shorting the antenna. For example, the electrical contacts 124 may include a conductive bar that directly or indirectly contacts the antenna 126 to form a short.

The RFID reader 140 can include any software, hardware, and/or firmware configured to transmit and receive RF signals. In general, the RFID reader 140 may transmit a request for information within a certain geographic area, or interrogation zone, associated with the reader 140. The reader 140 may transmit the query in response to a request, automatically, in response to a threshold being satisfied (e.g., expiration of time), as well as other events. The interrogation zone may be based on one or more parameters such as transmission power, associated protocol, nearby impediments (e.g., objects, walls, buildings), as well as others. In general, the RFID reader 140 may include a controller, a transceiver coupled to the controller (not illustrated), and at least one RF antenna 142 coupled to the transceiver. In the illustrated example, the RF antenna 142 transmits commands generated by the controller through the transceiver and receives responses from RFID tags 120 and/or antennas 126 in the associated interrogation zone. In certain cases such as tag-talks-first (TTF) systems, the reader 140 may not transmit commands but only RF energy. In some implementations, the controller can determine statistical data based, at least in part, on tag responses. The readers 140 often include a power supply or may obtain power from a coupled source for powering included elements and transmitting signals. In some implementations, the reader 140 operates in one or more of frequency bands allotted for RF communication. For example, the Federal Communication Commission (FCC) has assigned 902-928 MHz and 2400-2483.5 MHz as frequency bands for certain RFID applications. In some implementations, the reader 140 may dynamically switch between different frequency bands. For example, the reader 140 may switch between European bands 860 to 870 MHz and Japanese frequency bands 952 MHz to 956 MHz. Some implementations of system 100 may further include an RFID reader 140 to control timing, coordination, synchronization, and/or signal strength of transmissions by inhibitor antenna and RFID antenna.

Figure 2A:
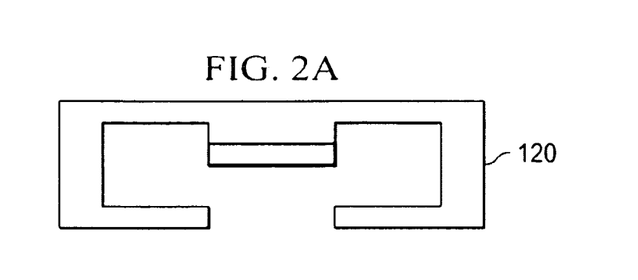
FIGS. 2A-B illustrate an example RFID tag configured to deactivate the RF carrier of the RFID tag.
Figure 2B:
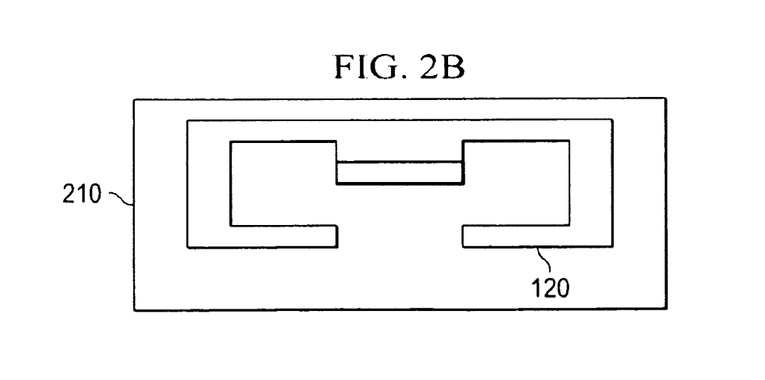

In general, RFID tags 120 may switch between activated and deactivated states. In some implementations, deactivation of an RFID tag 120 ordinarily involves suppressing the RF field of the RFID tag. The suppression of the RF field can be accomplished by physically blocking the RF carrier or electrically deactivating the RFID tag's antenna. FIGS. 2A-B illustrate an example RFID tag that is deactivated by physically blocking the RF signal carrier 126. This may be accomplished by placing a metal plate 210 in close proximity to the RFID tag 120 as shown in FIG. 2B. The metal plate 210 may be metal foil, which can be placed in front of or behind the RFID tag 120. RFID tag 120 may be operational when the metal plate 210 is removed from the vicinity of the tag 120 as in FIG. 2A but may be deactivated when the metal plate is placed in close proximity with the RFID tag 120 as in FIG. 2B. The metal plate may substantially block the RF signals between the tag 120 and the reader 140.

Figure 3A:
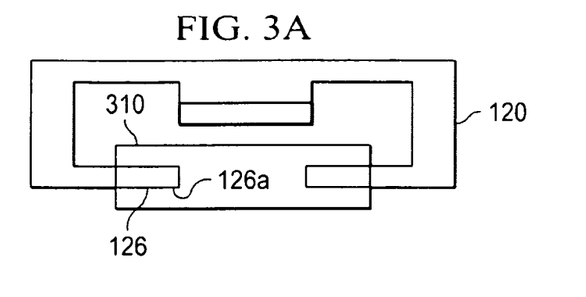
FIGS. 3A-B illustrate an example RFID tag configured to disable the antenna of the RFID tag.
Figure 3B:
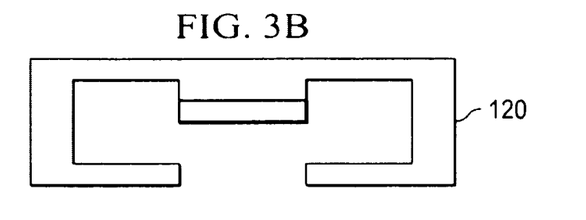

FIGS. 3A-B illustrate another example RFID tag 120 that deactivaties by shorting the antenna 126. The RFID tag 120 may be disabled by electrically short-circuiting, or shorting, the leads 302a and 302b of the antenna 126. In the illustrated implementation, the RFID tag 120 is shorted by selectively positioning a metal bar 310 across the antenna 126 as shown in FIG. 3A. Thus, when the metal shorting bar 310 forms a short circuit across the leads 302a and 302b, the antenna 126 is deactivated. When the shorting bar 310 is removed, as depicted in FIG. 3B, the RFID tag 120 and antenna 126 are operational. In some implementations, the metal bar 310 may form indirect electrical contacts through capacitive coupling between the antenna leads 302a and 302b and the shorting bar 310. Close proximity between the leads 302 and the bar 310 may yield similar results to ohmic contacts. In these instances, the RFID tag 120 may deactivate the metal shorting bar 310, which is less metal than the metal plate 210. In addition, the metal shorting bar 310 may interfere less with the tag 120 during an activate state as compared with the plate 210.

Figure 4A:
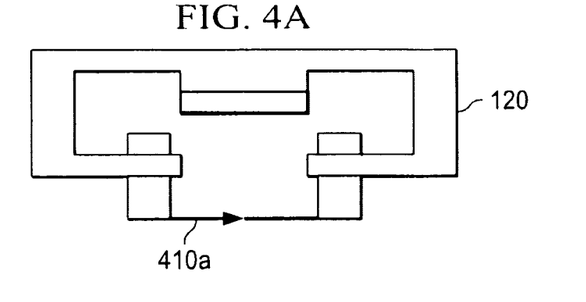
FIGS. 4A-B illustrate a conceptual apparatus and method of FIGS. 3A-B for deactivating an RFID tag.
Figure 4B:
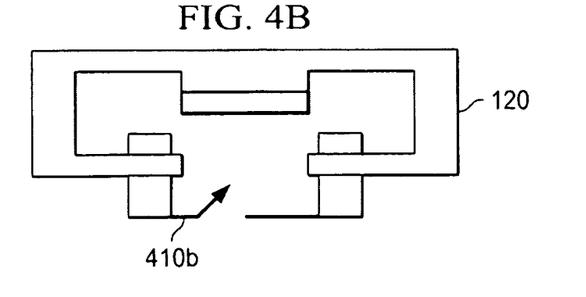

FIGS. 4A-B illustrate yet another example RFID tag 120 that deactivates by shorting the leads 302a and 302b. In the illustrated implementation, the RFID tag 120 includes a switch 410 with one electrical contact connected to the lead 302a and a second contact connected to the lead 302b. Referring to FIG. 4A, when the switch 410 is closed, the switch 410 connects the leads 302 of the antenna 126 to form a short. The closed switch 410 shorts the leads 302 to disable the RF functionality of the antenna 126. Referring to FIG. 4B, when the switch 410 is open, the leads 302 are not shorted and form an open circuit. In this instance, the leads 302 of the antenna 126 are activated and the RFID tag 120 is operational.

Figure 5A:
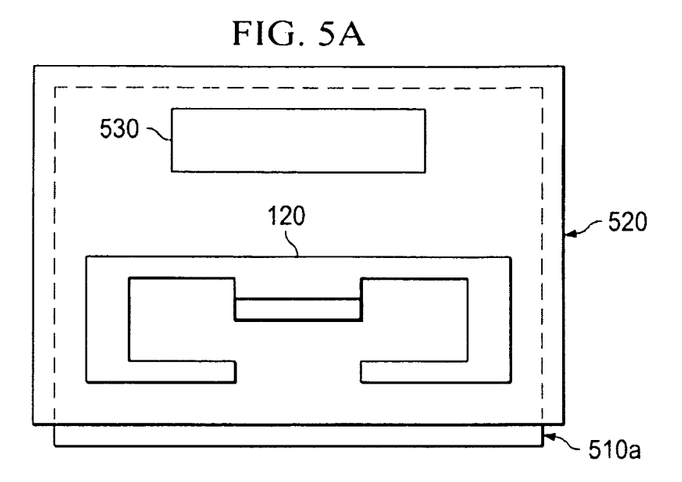
FIGS. 5A-B illustrate an example implementation of the apparatus of FIGS. 3A-B configured for deactivation and visual identification of the state of an RFID tag.
Figure 5B:
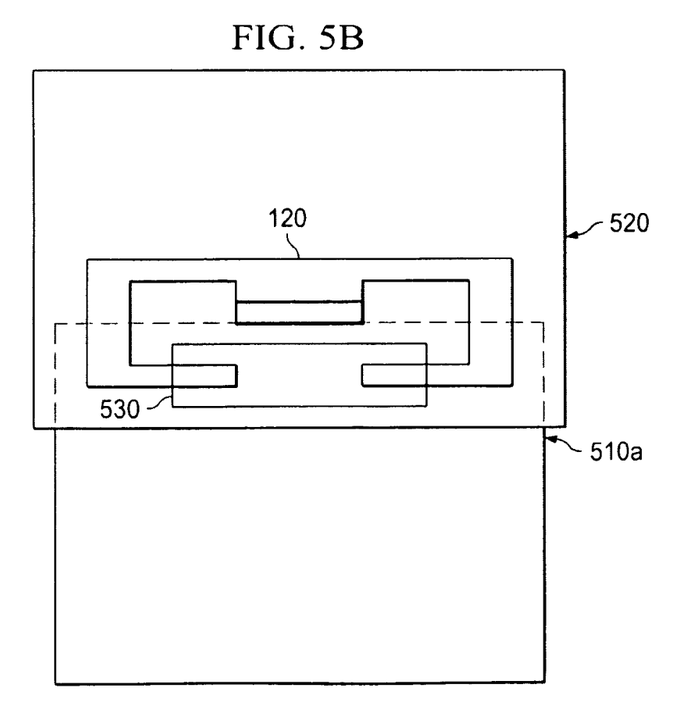

FIGS. 5A-B illustrate another example RFID tag 120 that deactivates using a sliding plate 510. Referring to FIG. 5A, the RFID tag 120 may include a case 520 including the RFID tag 120 affixed to a surface of the case 520. The pull-out slide 510 slides two different positions as illustrated in FIGS. 5A and 5B. The pull-out slide 510 includes a metal strip 530 attached to the surface of the pull-out slide 510, and the metal strip 530 operates as a shorting bar capable of deactivating the RFID tag 120. For example, the metal strip 530 may form electrical connections with the antenna 126 in the configuration illustrated in FIG. 2B. In general, the metal strip 530 may slide between a first position and a second position in response to a user positioning the slide 510 between two positions. In the active state, the slide 510 is inserted into or substantially enclosed by the cover 520 with the metal strip 530 not forming a shorting contact. Accordingly, this example tag 120 may allow easy activation and deactivation of the RFID tag 120 by pulling and inserting a pull-out slide 510 out of and into the case 520. Further, in some implementations, the slide can visually indicate the tag state, i.e., activated or deactivated. For example, the pull-out slide 510 may be marked a particular color, and an extended slide 510 can provide visual confirmation that the RFID tag 120 has been disabled. Similarly, the absence of the color may indicate that the slide 510 has been inserted into the case 520 and that the RFID tag 120 is activated.

Figure 6A:
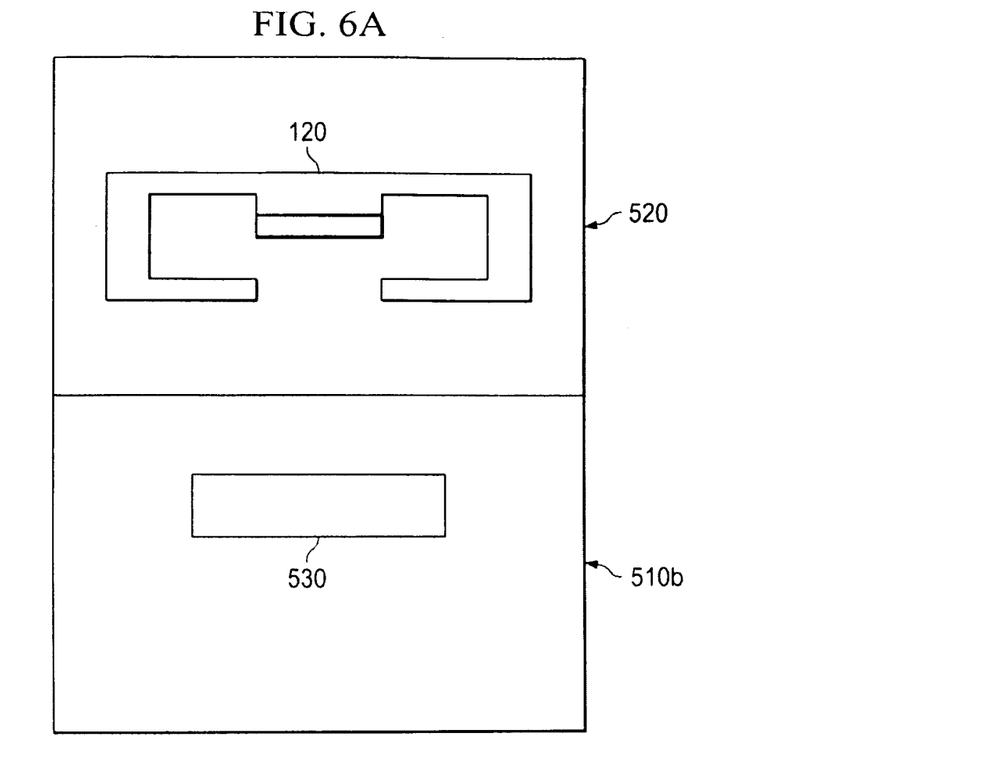
FIGS. 6A-B illustrate an example implementation of the apparatus of FIGS. 3A-B configured for deactivation and visual identification of the state of an RFID tag.
Figure 6B:
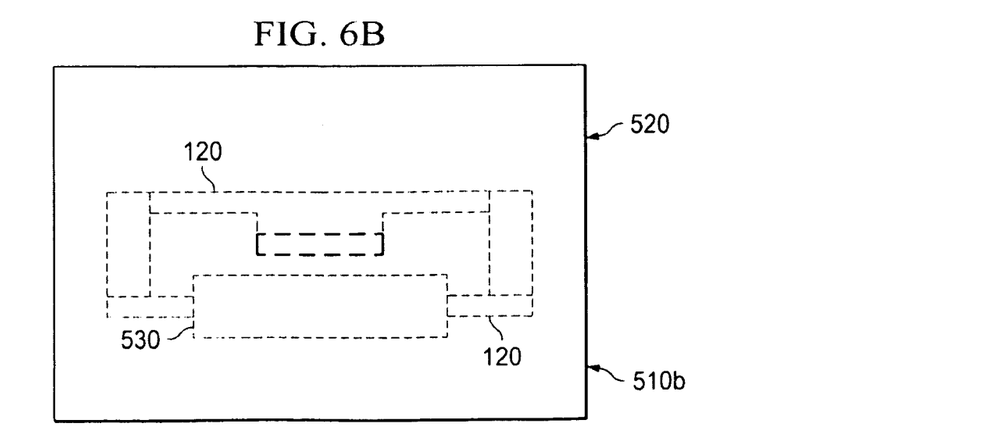

FIGS. 6A-B illustrate another example implementation of an RFID tag that is deactivated by shorting the leads 302 of the RFID antenna 126. In the illustrated example, an RFID tag 120 includes a case 620, and the RFID tag 120 is affixed to the surface of the case 620. A cover 610 is attached to the case 620 along a hinge or fold such that the cover 610 rotates about the hinge or fold between an open position and a closed position. In certain implementations, the cover 610 may be structurally similar to the slide 510 described in FIGS. 5A-B, with the difference that the cover 610 moves between two positions via a hinge or fold as opposed to a sliding mechanism. As seen in FIG. 6A, when the cover 610 is in an open position, the RFID tag 120 is in an active state. When the cover 610 is in a closed position as shown in FIG. 6B, the RFID tag 120 is deactivated. Attached to the surface of the cover 610 is a metal strip 630 that operates as a shorting bar to deactivate the tag 120 in the second configuration illustrated in FIG. 6B. The metal strip 630 comes in contact and/or overlaps the leads 302a and 302b to form electrical contacts. In these instances, the metal strip 630 forms a short circuit between the leads 302 of the RFID antenna 126, and the RFID tag 120 is deactivated. When the cover 610 is open as depicted in FIG. 6A, the metal strip 630 no longer shorts the antenna 126 and results in activation of the tag 120. In other words, the RFID tag 120 is activated when the cover 610 is in an open position and deactivated when the cover 610 is in a closed position. In addition, the cover 610 may visually identify whether the tag 120 is activated or deactivated. For example, the inner surface of the cover 610 may be marked one color and the outer surface of the cover 610 may be marked a different color. Thus, when the cover 610 is in a closed position, only one color is visually apparent, indicating that the RFID tag 120 is deactivated. Likewise, when the cover 610 is opened, a separate color is visible, indicating that the RFID tag 120 is activated.

Some applications may include more functionality than merely the ability to read or deactivate an RFID tag. For example, some applications may update the tag's response as compared with deactivation. Accordingly, in certain implementations, an RFID tag, such as multi-level switched state RFID tags, can switch to different states in addition to an activated and deactivated state and can be switched between the plurality of states in response to a moveable element. In these instances, the RFID tag may be set to a logical state by altering the RF energy instead of shorting the RF energy, as may be implemented when deactivating the RFID tag.

Figure 7A:
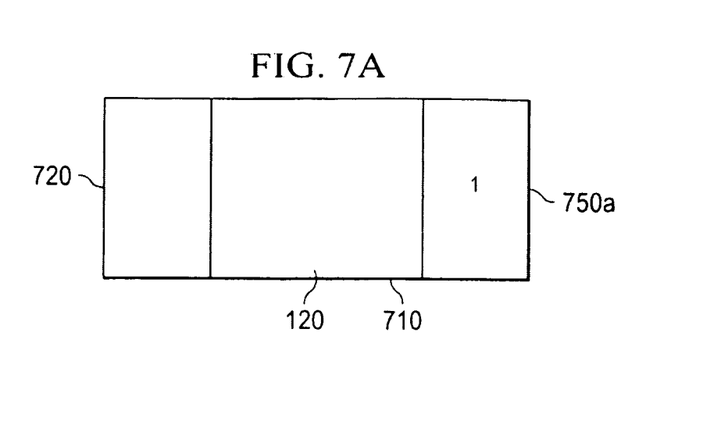
FIGS. 7A-C illustrate an example multi-level switched state RFID tag configured for switching between multiple, visually identifiable states.
Figure 7B:
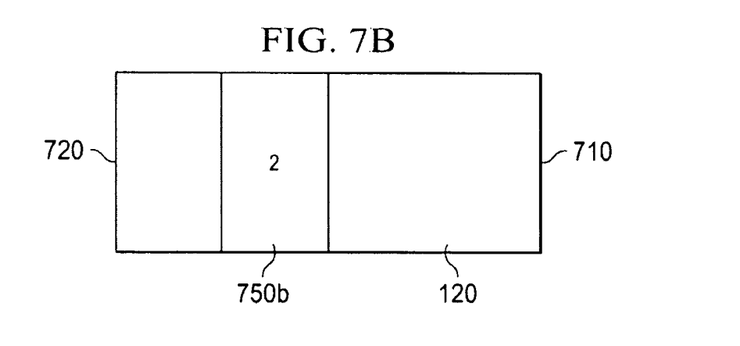
Figure 7C:
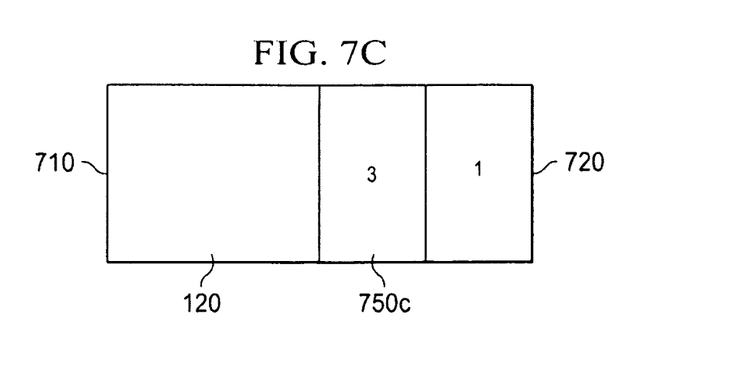

FIGS. 7A-C illustrate an example RFID tag 120 that may be selectively switched between three states including activation and deactivation. In the illustrated implementation, the tag 120 includes slide 720 configured to switch between the different states. The RFID tag 120 includes a case 710 and the slide 720 that is moveable relative to the case 710. In some implementations, the RFID chip and antenna may be embedded in, affixed to, or otherwise included with the case 710. The slide 720 is operable to move relative to the case 710 to a plurality of different positions, where each position may be associated with a different tag state. For example, each of the plurality of positions may be configured to update the RF energy to a different state of the RFID tag 120. As shown in FIG. 7A, the slide 720 can be positioned at a center point such that substantially equal portions of the slide 720 extend from opposite sides of the case 710. In response to at least selectively positioning the slide 720 at this location, the RFID tag 120 may be updated to a first state based on the RF energy associated with the RFID tag 120 in the first position. When the slide 720 is positioned to the left, as seen in FIG. 7B, the cover 710 overlaps a right portion of the slide 720 and may update the RFID tag 120 to a second state. When the slide 720 is positioned to the right, as seen in FIG. 7C, the cover 710 overlaps a left portion of the slide 720 and may update the RFID tag 120 to a third state. In the illustrated example, the slide 720 may also include colored markings to visually indicate the state of the tag 120 as the slide 720 is switched between the plurality of different positions. For example, in FIG. 7A the exposed portion 750a of the slide 720 may be green indicating an activated state, in FIG. 7B the exposed portion 750b of the slide 720 may be yellow indicating a different operational state, and in FIG. 7C the newly exposed portion 750c of the slide 720 may be red indicating a deactivated state. In these instances, the different exposed colors on the slide 720 may enable visual recognition of the state of the tag 120. Furthermore, using the colored slide implementation of the multi-level switched state tag, the state of the tag may be visually identified from either side of the tag, which may be beneficial in certain implementations, such as when the RFID tag is fixed on the windshield of a vehicle.

Figure 8A:
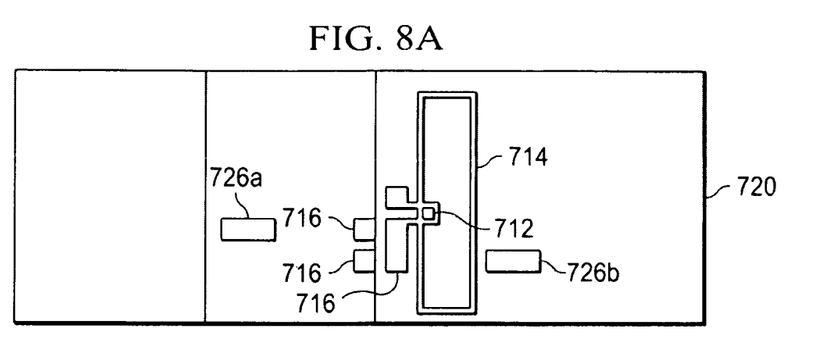
FIGS. 8A-C illustrate enlarged views of a multi-level switched state RFID tag, such as the RFID tag of FIGS. 7A-C.
Figure 8B:
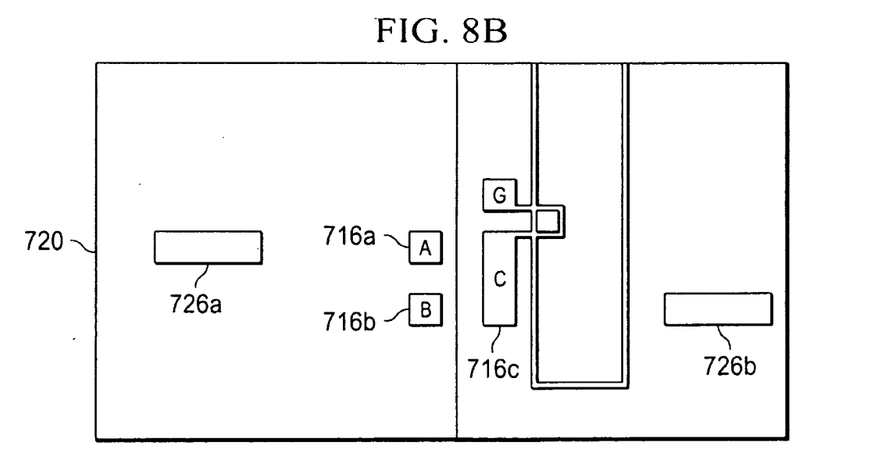
Figure 8C:
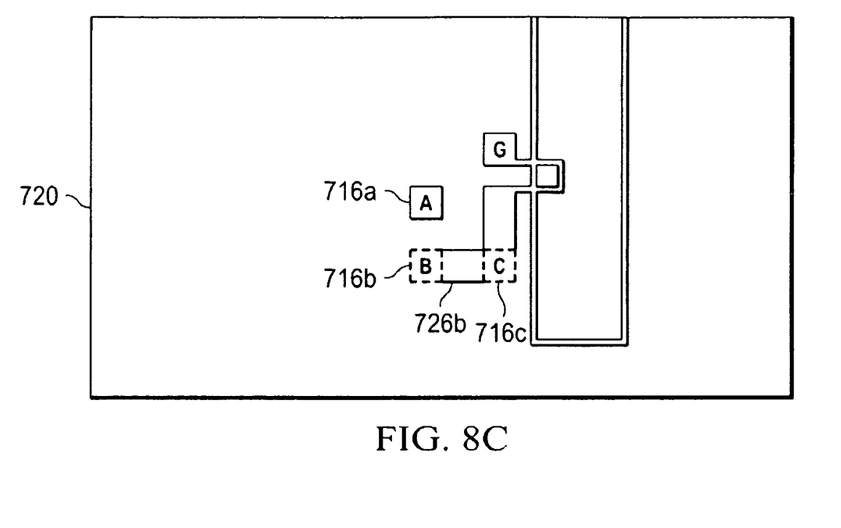

FIGS. 8A-C illustrate example circuitry for switching the tag 120 of FIG. 7 between the different states. The case 710 includes an RFID chip 712, RFID antenna 714, conductive pads 716 and/or other elements. The conductive pads 716 on the case 710 may be connected to isolated nodes within the internal circuit. In the illustrated example, the slide 720 also includes conductive pads 726 fixed to the surface of the slide. The conductive pads 726 on the slide are positioned so that as the slide 720 moves into specified positions, the conductive pads 726 on the slide 720 electrically contact associated conductive pads 716 on the RFID case 710. Once the conductive pads 716 and 726 are in contact, the conductive pads 726 on the slide 720 form a direct or indirect electrical connection.

FIG. 8B illustrates an enlarged view of the circuitry associated with the RFID case 710 and slide 720. The individual conductive pads 716a-c of the RFID case 710 are isolated from each other while the slide 720 is in a center position corresponding with the first state of the RFID tag 120 as described with respect to FIG. 7A. In this position, the conductive pads 726a-b on the slide 720 are isolated from the conductive pads 716a-c on the RFID case 710. FIG. 8C illustrates the case 710 and slide 720 at different relative positions associated with the second state. In this instance, the conductive pad 726b overlaps conductive pads 716b and 716c to form an electrical connection between these pads 716. In addition, the slide 720 may be shifted to the right into a position corresponding with a third state of the RFID tag (see FIG. 7C). In this instance, the conductive pad 726a overlaps conductive pads 716a and 716c.

Figure 9:
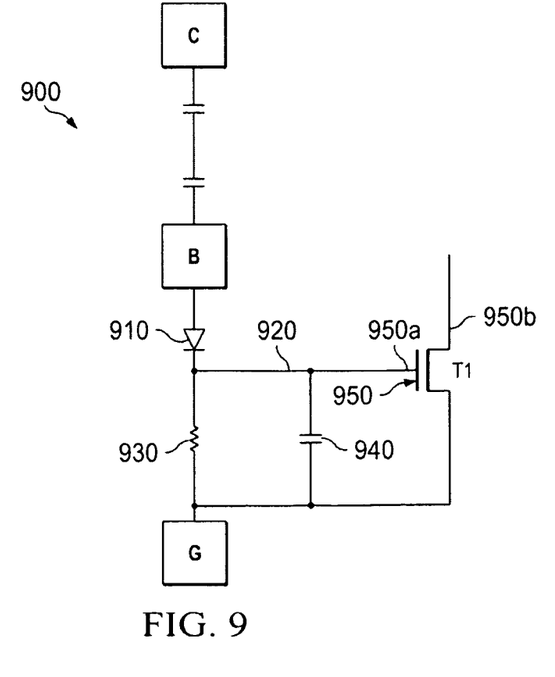
FIG. 9 is a low-level view of an internal circuit of an RFID tag, such as the RFID tag of FIGS. 7A-C.

FIG. 9 illustrates an example circuit 900 used in connection with the pads 716 and 726. Conductive pads 716b and 716c are illustrated as nodes in the circuit 900. In the illustrated example, when the slide 720 is positioned in the second state (e.g., FIGS. 7B and 8C), the conductive pad 726b is substantially aligned with pads 716a and 716c. In this case, the RF signal is conducted through a Schottky diode 910, which may cause node 920 (the common node of resistor 930, capacitor 940, and gate of transistor 960) to increase in voltage. As a result, transistor 950 is activated, and the drain of transistor 970 can be used to pull down a resistor or the input of a circuit mounted on an associated printed circuit board. In some implementations, based on the design of circuit 900 and values of the components comprising circuit 900, the voltage on node 920 may rise in a relatively short period of time when compared to the time that the voltage would be maintained when the RF power is removed. A circuit identical or similar to circuit 900 in FIG. 9 may be used to transition the RFID tag 120 into a third state when the slide 720 is shifted to the right as illustrated in FIG. 7C and conductive pads 716a and 716c are electrically connected.

A number of embodiments of the invention have been described. Nevertheless, it will be understood that various modifications may be made without departing from the spirit and scope of the invention. Accordingly, other embodiments are within the scope of the following claims.

What is claimed is:

1. An RFID system comprising:
   an RFID tag including an antenna affixed to a first panel; and
   a second panel including a first portion of the panel with a first image, a second portion of the panel with a second image, and a metal element configured to move relative to the RFID tag affixed to the first panel between a first position and a second position, the metal element in the second position forms electrical connections with a first portion of the antenna and a second portion of the antenna, and the second position is configured to substantially conceal the first portion of the second panel with the first image while the second portion of the second panel with the second image is visible.

2. The RFID system of claim 1, the electrical connections formed in the second position short the antenna.

3. The RFID system of claim 1, the electrical connections formed by a capacitive coupling between the metal element and the first portion and the second portion of the antenna.

4. The RFID system of claim 1, the electrical connections form a short between the first portion of the antenna and the second portion of the antenna to deactivate the RFID tag.

5. The RFID system of claim 1, the metal element comprising metal foil.

6. The RFID system of claim 1, further comprises a case including the first panel and configured to enclose at least a portion of the second panel, the RFID tag affixed to the case.

7. The RFID system of claim 1, further comprises a case including the first panel and configured to slide relative to the second panel to a plurality of different positions, each position associated with a different tag state, and the RFID tag affixed to the case.

8. The RFID system of claim 1, at least of one of the first visual indicator or the second visual indicator includes one or more colors to visually identify a current state of the RFID tag.

9. A method, comprising:
   wireless communicating with an RFID reader in accordance with a first set of operating parameters associated with a first physical configuration of an RFID tag, wherein the RFID tag includes an antenna, is affixed to a first panel and is movable relative to a second panel including a first portion of the second panel with a first image and a second portion of the second panel with a second image, the first physical configuration configured to substantially conceal the second image while the first image is visible; and
   in response to at least updating the RFID tag to a second physical configuration, updating operating conditions of the RFID tag to a second set of operating parameters, wherein the second panel includes a metal element configured, in the second physical configuration, to form electrical connections with a first portion of the antenna and a second portion of the antenna, and the second physical configuration is configured to substantially conceal the first image while the second image is visible.

10. The method of claim 9, the electrical connections formed in the second physical configuration short the antenna.

11. The method of claim 9, the electrical connections includes capacitively coupling the first portion of the antenna and the second portion of the antenna.

12. The method of claim 9, the electrical connections form a short between the first portion of the antenna and the second portion of the antenna to deactivate the RFID tag.

13. The method of claim 9, the metal element includes a metal foil.

14. The method of claim 9, wherein the RFID tag is affixed to the first panel of a case configured to enclose at least a portion of the second panel.

15. The method of claim 9, wherein an update to the second configuration includes sliding a cover including the first panel relative to the second panel to a plurality of different positions, each position associated with a different tag state.

16. The method of claim 9, at least of one of the first visual indicator or the second visual indicator includes one or more colors to visually identify a current state of the RFID tag.

17. A system, comprising:
a means for wireless communicating with an RFID reader in accordance with a first set of operating parameters associated with a first physical configuration of an RFID tag, wherein the RFID tag includes an antenna, is affixed to a first panel, and is movable relative to a second panel including a first portion of the second panel with a first image and a second portion of the second panel with a second image, the first physical configuration configured to substantially conceal the second image while the first image is visible; and in response to at least updating the RFID tag to a second physical configuration, a means for updating operating conditions of the RFID tag to a second set of operating parameters, wherein the second panel includes a metal element configured, in the second physical configuration, to form electrical connections with a first portion of the antenna and a second portion of the antenna, and the second physical configuration is configured to substantially conceal the first image while the second image is visible.

18. The system of claim 17, at least of one of the first visual indicator or the second visual indicator includes one or more colors to visually identify a current state of the RFID tag.

19. The RFID system of claim 1, wherein the first image comprises a first shape with a first color and the second image comprises a second shape with a second color different from the first color.

20. The method of claim 9, wherein the first image comprises a first shape with a first color and the second image comprises a second shape with a second color different from the first color.

* * * * *

UNITED STATES PATENT AND TRADEMARK OFFICE
CERTIFICATE OF CORRECTION

PATENT NO. : 8,416,079 B2
APPLICATION NO. : 12/477064
DATED : April 9, 2013
INVENTOR(S) : Bruce B. Roesner Page 1 of 1

It is certified that error appears in the above-identified patent and that said Letters Patent is hereby corrected as shown below:

On the Title Page

Column 2 (Other Publications)

Line 18, delete "Impinji," and insert -- Impinj, --, therefor.

Line 57, delete "FRID" and insert -- RFID --, therefor.

In the Specifications

Column 5

Line 15, delete "deactivaties" and insert -- deactivates --, therefor.

Signed and Sealed this
Thirteenth Day of August, 2013

Teresa Stanek Rea
*Acting Director of the United States Patent and Trademark Office*